US011469983B1

(12) United States Patent
Malov et al.

(10) Patent No.: US 11,469,983 B1
(45) Date of Patent: Oct. 11, 2022

(54) CORRELATING AND MEASURING THE EFFECT OF ADVERSE NETWORK EVENTS ON SPECIFIC TRAFFIC FLOWS

(71) Applicant: Amazon Technologies, Inc., Seattle, WA (US)

(72) Inventors: Stanislav Vladimirovich Malov, Edmonds, WA (US); Arran McCabe, Seattle, WA (US); Nikolaos Pavlakis, Seattle, WA (US); Alan O'Leary, Dublin (IE); Ivan Emilov Goychev, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/820,576

(22) Filed: Mar. 16, 2020

(51) Int. Cl.
| G06F 15/173 | (2006.01) |
| H04L 43/0823 | (2022.01) |
| H04L 41/0654 | (2022.01) |
| H04L 41/12 | (2022.01) |
| H04L 43/0829 | (2022.01) |
| H04L 43/091 | (2022.01) |

(52) U.S. Cl.
CPC ...... *H04L 43/0823* (2013.01); *H04L 41/0654* (2013.01); *H04L 41/12* (2013.01); *H04L 43/0829* (2013.01); *H04L 43/091* (2022.05)

(58) Field of Classification Search
CPC .. H04L 43/0823; H04L 41/0654; H04L 41/12
USPC .................................................. 370/216, 254
See application file for complete search history.

(56) References Cited

U.S. PATENT DOCUMENTS

| 8,243,911 B1 * | 8/2012 | Abidogun | ............... H04L 45/28 379/221.03 |
| 2010/0031156 A1 * | 2/2010 | Doyle | .................. H04L 43/022 715/736 |
| 2019/0123993 A1 * | 4/2019 | Rangappagowda | .... H04L 45/02 |
| 2021/0135948 A1 * | 5/2021 | Oren | ....................... H04L 41/12 |

* cited by examiner

*Primary Examiner* — Wing F Chan
*Assistant Examiner* — Joseph R Maniwang
(74) *Attorney, Agent, or Firm* — Klarquist Sparkman, LLP

(57) ABSTRACT

An exposure of a user of a network to an adverse network event can be estimated based on network topology data, network traffic associated with the user, and network performance data. A subgraph of the network topology including candidate paths through the network devices and links of the topology that were traversed by the user's network traffic can be estimated using the network topology data and the network traffic data associated with the user. Using the network performance data, an adverse network event can be mapped on the candidate paths of the subgraph to determine an impact of the adverse network event on the user's network traffic. Upon determining that the adverse network event impacts the user, the user can be notified regarding the adverse network event. Optionally, actions to reduce the impact of the network event on the user can be performed.

11 Claims, 13 Drawing Sheets

US 11,469,983 B1

CORRELATING AND MEASURING THE EFFECT OF ADVERSE NETWORK EVENTS ON SPECIFIC TRAFFIC FLOWS

BACKGROUND

Cloud computing is the use of computing resources (hardware and software) which are available in a remote location and accessible over a network, such as the Internet. Users are able to buy these computing resources (including storage and computing power) as a utility on demand from compute service providers. Cloud computing entrusts remote services with a user's data, software and computation. Use of virtual computing resources can provide a number of advantages including cost advantages and/or the ability to adapt rapidly to changing computing resource needs.

Some compute service providers provide monitoring services that detect adverse network events. Adverse network events can include, for example, packet loss and/or increased latency affecting traffic in certain areas of the network. While such monitoring services can inform users of adverse network events affecting a given area of the network, the monitoring services fall short of determining whether the adverse network events actually impact a given user, and if so, to what extent.

DETAILED DESCRIPTION

Figure 1:
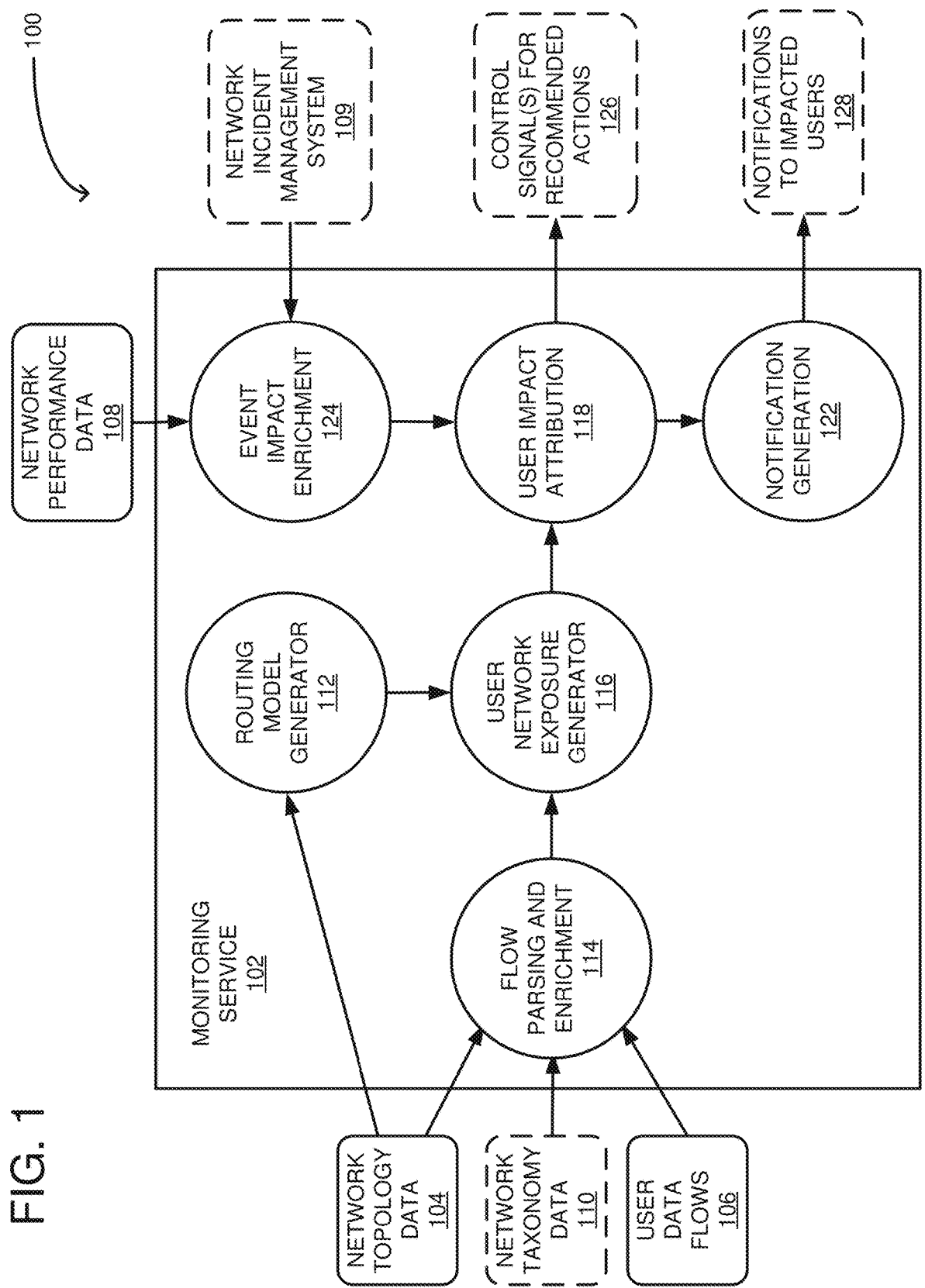
FIG. 1 shows an example workflow diagram for correlating and measuring the effect of adverse network events on specific users of a network.

An exposure of a user of a network to an adverse network event can be estimated based on network topology data and data regarding the user's network traffic data. In particular, a user-specific subgraph of a network topology can be determined from a full network topology by using flow logs of the user's network traffic data to map the physical source and destination locations of their flows to physical network devices. Once these locations are identified, path finding algorithms can be used to identify all possible paths between each source and destination pair. Candidate paths that were traversed by user data flows can be identified amongst the possible paths using probabilistic strategies and used to form the user-specific subgraph. The user-specific subgraph can then be combined with active and passive network monitoring data in order to infer the subjective experience of individual network users.

For example, a computer-implemented monitoring service can receive a topology of a network. The topology can include a plurality of network devices and a plurality of links between the network devices. The monitoring service can also receive network traffic data associated with a particular user of the network, the network traffic data comprising respective pairs of source and destination addresses for a plurality of data flows for that user. A subgraph of the topology for the user can be estimated based on (e.g., based at least in part on) the network traffic data, the subgraph including candidate paths through the network devices and links of the topology that were traversed by the user data flows. Upon receiving data regarding an adverse network event that potentially impacts the user, the monitoring service can then estimate an exposure of the user to the adverse network event by mapping the data regarding the adverse network event on the candidate paths. The adverse network event can include, for example, increased packet loss relative to a baseline level of packet loss and/or increased latency relative to a baseline level of latency. The estimated exposure of the user to the adverse network event can then be transmitted, e.g. to the user via notification.

In some examples, upon determining that a user is exposed to an adverse network event, actions can be automatically performed to reduce the impact of the adverse network event on the user, such as reallocating network resources associated with the user to a location within the network that is not impacted by the adverse network event. In other examples, detailed information regarding the adverse network event can be provided to the user, which can include a recommended action for reducing the impact of the adverse network event on the user, and the user can then choose whether to act on this information.

The user-specific network topology subgraphs described herein can also serve other purposes. For example, the subgraphs can be used to develop user-specific network scaling models, to identify availability risks in user applications (e.g., network area redundancy), and/or to simulate the impact of various network events on user applications.

FIG. 1 is a workflow diagram 100 for estimating an exposure of one or more users of a computer network to an adverse network event. As shown, a monitoring service 102 can receive one or more inputs and perform various actions on the inputs to produce one or more outputs. Monitoring service 102 can be implemented by one or more server computers. In some examples, the users are users of a compute service provider, and the one or more server computers are associated with the compute service provider. In other examples, the users are particular services operating on the computer network.

As shown, the inputs to monitoring service 102 can include network topology data 104, user data flows 106, network performance data 108, and inputs from a network incident management system 109. Optionally, the inputs can also include network taxonomy data 110. Monitoring service 102 can also receive other inputs without departing from the scope of this disclosure.

Network topology data 104 can include data providing a representation or model of the physical topology of the computer network. Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is generally not scalable. Thus, the connections between large numbers of devices will typically be via indirect connections. For example, one device can be connected to another device via an interconnection network comprising one or more routers. Large routers for connecting many devices together can be expensive. However, the functional equivalent of large routers can be constructed from lower cost commodity equipment interconnected as a network fabric. A network fabric can include multiple network devices interconnected by multiple network links. Network devices can include devices configured that can originate, transmit, receive, forward, and/or consume information within the network. For example, a network device can be a router, a switch, a bridge, an endpoint, or a host computer. The network fabric can be architected or organized in various ways which can be described by a topology of the network. Specifically, the topology of the network can describe the connectivity of the network devices and links that form the network. As one example, the network fabric can be organized as a hierarchy of interconnected components. In particular, the network devices can be organized by rows or tiers, as discussed further below with reference to FIG. 3. The network devices within a tier are generally not directly connected to each other, and the network devices within a given tier can be fully or partially connected to a neighboring tier. Thus, the different devices within a tier can provide redundant connections to a neighboring tier to potentially increase bandwidth and/or availability between the tiers. Additionally or alternatively, the network devices can be grouped into logical devices. For example, the network devices can be grouped into logical devices that describe the connectivity of the devices within the group. Exemplary logical devices can include multi-tier architectures such as Clos, folded-Clos, fat-tree, butterfly, flattened-butterfly, and dragonfly networks.

The network topology data can include data regarding network devices of the network as well as possible links or paths available between the network devices, which can be based on a routing strategy such as equal cost multipath (ECMP) routing or shortest-path routing. The network topology data can also include address information for the network devices or groups of network devices, e.g., prefixes for top-of-rack (TOR) routers. In some examples, the representation of the network provided by the network topology data is a "zoomed out" representation, in which network devices that share a common function are grouped together (as opposed to a representation depicting each individual network device).

In some examples, network topology data 104 is updated frequently to reflect changes to the network, and updated network topology data is provided to the monitoring service as it becomes available or responsive to a request from the monitoring service. In some examples, the network topology data is generated by a service external to the monitoring service.

User data flows 106 can include records of network traffic associated with the users. The user data flows can be aggregated as flow logs. In some examples, flow logs of user data flows can be generated at virtual machine instances. In other examples, flow logs of user data flows can be generated at non-virtual (physical) machine instances, or at routers. Such flow logs can include data regarding the user data flows that occurred during a specified time period. The user data flows can include records of Layer 3 and 4 traffic and metering information associated with the users. In particular, the user data flows can provide information on network interactions associated with users, which can include source and destination information for data flows associated with the users and network devices traversed by the user data flows. The source information for a given user data flow can include, for example, an IP address associated with the source of the user data flow (e.g., the IP address of a hypervisor running an instance that originated the user data flow). As discussed further below with reference to FIG. 2, an "instance" can refer to a virtual machine which functions as an instance of a software implementation of a machine (i.e. a computer) and executes applications like a physical machine, or alternatively, to a physical machine. The destination information for a given user data flow can include, for example, an IP address associated with a destination or endpoint of the user data flow (e.g., the IP address of a hypervisor running a user instance to which the user data flow was sent). In some examples, the user data flows are collected by a network traffic data collection service, such as network traffic data collection service 222 of FIG. 2. The network traffic data collection service can include software that runs on individual user instances and collects traffic data associated with the user instances, or software that runs on routers and collects traffic data for traffic traversing the routers. The data collection service can generate parcels, each parcel carrying data (e.g., for a given user or user instance) regarding network traffic that occurred during a specified interval of time such as 5-10 minutes. Taken collectively, the user data flows for a given user can provide a snapshot of the user's utilization of the network (e.g., a snapshot of which portions of the network are exercised by the user).

In one non-limiting example, a flow log can include a plurality of records of user data flows 106, each record encompassing a predetermined interval of time (e.g., 1 minute). The records can each include, for example, a source IP address, a destination IP address, a source port, a destination port, and a protocol used. This group of data can alternatively be referred to as a 5-tuple. Optionally, each record can also include one or more of an instance ID, a number of packets transferred, and Transmission Control Protocol (TCP) status.

Additional network traffic data can also be collected and provided to the monitoring service without departing from the scope of this disclosure. In some examples, the additional network traffic data includes user-specific probing rates for one or more links within the network or locations/areas of the network, e.g., a frequency at which the packets associated with the user are traversing a specified portion of the network. For example, the user-specific probing rate for a given link/location/area can indicate the percentage of network packets passing through that link/location/are that are associated with that user. The user-specific probing rate for a given user and link/location/area can alternatively be referred to as the user's exposure to that particular link/location/area. As used herein, a network "location" can refer to a geographic area in which a number of datacenters are hosted. Each datacenter can include one or more buildings housing network devices (servers, routers, etc.). Further, as used herein, a network "area" can refer to a group of network devices; a given network location can include a plurality of network areas. In some examples, the network devices of a given network area are physically located in one or more buildings in close proximity to one another (e.g., within the same datacenter).

Referring particularly to links between network devices (e.g., spans or paths), another type of network traffic data that can be collected pertains to how often a given one of a plurality of possible paths between network devices is traversed by a user's network traffic. For example, in a hypothetical scenario in which two network devices are linked by two possible paths A and B, it can be useful to know how often the user's network traffic will traverse path A and how often it will traverse path B (e.g., 25% of the user's traffic takes path A and 75% of the user's traffic takes path B). These metrics can also be referred to as the user's exposure to the respective paths. As discussed further below, probabilistic determination methods can be utilized to estimate how often a user's network traffic will take a given network path.

Network performance data 108 can include data concerning the health of the network. In some examples, network performance data 108 is generated by a service such as network performance data collection service 220 of FIG. 2. The network performance data collection service can include agents that exchange data (e.g., pings and traceroutes) in order to assess the health of the network. In some examples, the agents can run on individual user instances. Optionally, the agents can send probes across the network and gather statistics regarding the success and failure rate of the probes. In some examples, network performance data 108 includes data identifying specific network devices, paths, or areas of the network which are not performing as intended (e.g., due to an outage or other adverse network event). As one non-limiting example, network performance data 108 can include specifying that a particular link between network devices is experiencing packet loss (e.g., 20% packet loss). Accordingly, network performance data 108 can be used to quantify the impact of an adverse event on the network (e.g., by providing packet loss measurements).

Network incident management system 109 can provide a list of ongoing events/incidents that may be the root cause of the network impairment (e.g., the network impairment reflected by the network performance data). In some examples, network incident management system 109 generates the list of ongoing events/incidents based on alarms and monitors emanating from network devices. Network incident management system 109 can be external to/independent from monitoring service 102 (e.g., it can be a service operated by a different entity than the entity operating monitoring service 102), as shown, or it can be included in monitoring service 102.

Optional network taxonomy data 110 can include supplementary information that can be used to map the source or destination of a user data flow to a physical location. The physical location can be associated with a network operated by a compute service provider, or another autonomous network. The mapping can involve use of IP subnet(s) or other subnet database(s) which map to approximate GPS coordinates. The network taxonomy data 110 can be used to resolve the order of an IP address (e.g., server, network area, service, specific user, geographic location, autonomous system) associated with the source or destination of a user data flow to something meaningful that can be used in the event impact attribution process described below.

In the depicted example, monitoring service 102 includes a plurality of sub-services, each sub-service performing a designated function. The sub-services include a routing model generator 112. Routing model generator 112 can generate a routing model for the network utilizing a specified routing protocol, such as the ECMP routing protocol or the shortest-path routing protocol. In some examples, the routing model generator 112 can be further configured to handle exceptions to a specified routing protocol, and/or to support load-balanced traffic.

The sub-services of monitoring service 102 further include a flow parsing and enrichment sub-service 114 which receives as inputs the network topology data 104, user data flows 106, and optional network taxonomy data 110. The flow parsing and enrichment sub-service 114 can enrich the user data flows based on the network topology data. For example, the flow parsing and enrichment sub-service 114 can enrich the source and destination data in the user data flows with network topology data regarding the sources and destinations of the user data flows, e.g., address information and information regarding network areas in which the sources and destinations are disposed.

Outputs produced by the routing model generator and flow parsing and enrichment sub-services 112 and 114 are provided to a user network exposure generator sub-service 116. As discussed further below with reference to FIG. 4, the user network exposure generator sub-service 116 can "trim" the full network topology to respective user-specific topologies for the users, thereby generating what can be referred to as a subgraph of the full network topology for each user. The subgraph of the full network topology for a given user can include candidate paths through the network devices and links of the topology that were traversed by that user's data flows. The determination of the candidate paths performed by the user network exposure generator sub-service 116 can be based on (e.g., based at least in part on) network traffic data, such as the user data flows 106, as well as network topology data 104 and, optionally, network taxonomy data 110. In particular, the candidate paths can be determined by the user network exposure generator sub-service 116 based at least in part on the enriched source and destination data for the user data flows as produced by the flow parsing and enrichment sub-service 114 based on the network topology data 104. Outputs produced by the user network exposure generator sub-service 116 are provided to a user impact attribution sub-service 118, which is discussed further below.

In some examples, the user network exposure generator sub-service 116 can determine the candidate paths using a probabilistic determination strategy (e.g., as opposed to a definitive determination of which paths were actually taken by the user data flows). For example, if the source address and destination address of a user data flow are known, network topology can be used to map the source address and destination address to actual network devices and identify all possible paths between the network devices. The probability that a given path from among all possible paths between the network devices was traversed by a given user data flow can then be determined based on various factors. For example, the probability can be determined based on (e.g., based at least in part on) the routing protocol specified for the user data flow (e.g., ECMP routing). Optionally, the subgraph of the full network topology for a given user can be "weighted" based on the probabilistic determination. The "weighted" subgraph can include respective weights for various paths through the network which represent the proportion of user network traffic that likely travels on the paths.

In some examples, a confidence level of the probabilistic determination of which paths were traversed by a user's network traffic can be determined. The confidence level can increase with increased knowledge of user network traffic, and with increased flow diversity of user network traffic.

Monitoring service 102 further includes an event impact enrichment sub-service 124. As shown, event impact enrichment sub-service 124 receives the network performance data 108 input to the monitoring service, and optionally receives further inputs from network incident management system 109. The network performance data 108 can provide an indication of how the network is adversely impacted, whereas the inputs received from the network incident management system 109 can provide an indication of ongoing events/incidents that may be causing the adverse impact. The event enrichment sub-service 124 can then assign portions of the impact observed to each ongoing event/incident.

Outputs produced by the event impact enrichment sub-service 124 are provided as inputs to the user impact attribution sub-service 118. As noted above, the user impact attribution sub-service 118 also receives data output by the user network exposure generator sub-service 116 as inputs. The function of the user impact attribution sub-service 118 is to correlate the network performance data 108, as enriched by the event impact enrichment sub-service, to specific users based on the users' exposure to the network (e.g., as determined by user network exposure generator sub-service 116). As discussed further below with reference to FIG. 4, this can include mapping the network performance data to a subgraph of the full network topology for a given user, the subgraph including candidate paths through the network devices and links of the topology that were traversed by that user's data flows. In this way, the user impact attribution sub-service 118 can determine whether, and to what extent, user data flows are affected by adverse network events.

As shown, outputs produced by the user impact attribution sub-service 118 optionally include one or more control signals for recommended actions 126. The recommended actions can include actions to be taken to reduce the impact of an adverse network event on one or more users affected by the adverse network event. The actions can include, for example, the user moving their resources (or agreeing to have their resources moved by an entity such as a compute service provider) to a portion of the network that is not affected by the adverse network event(s).

Figure 8:
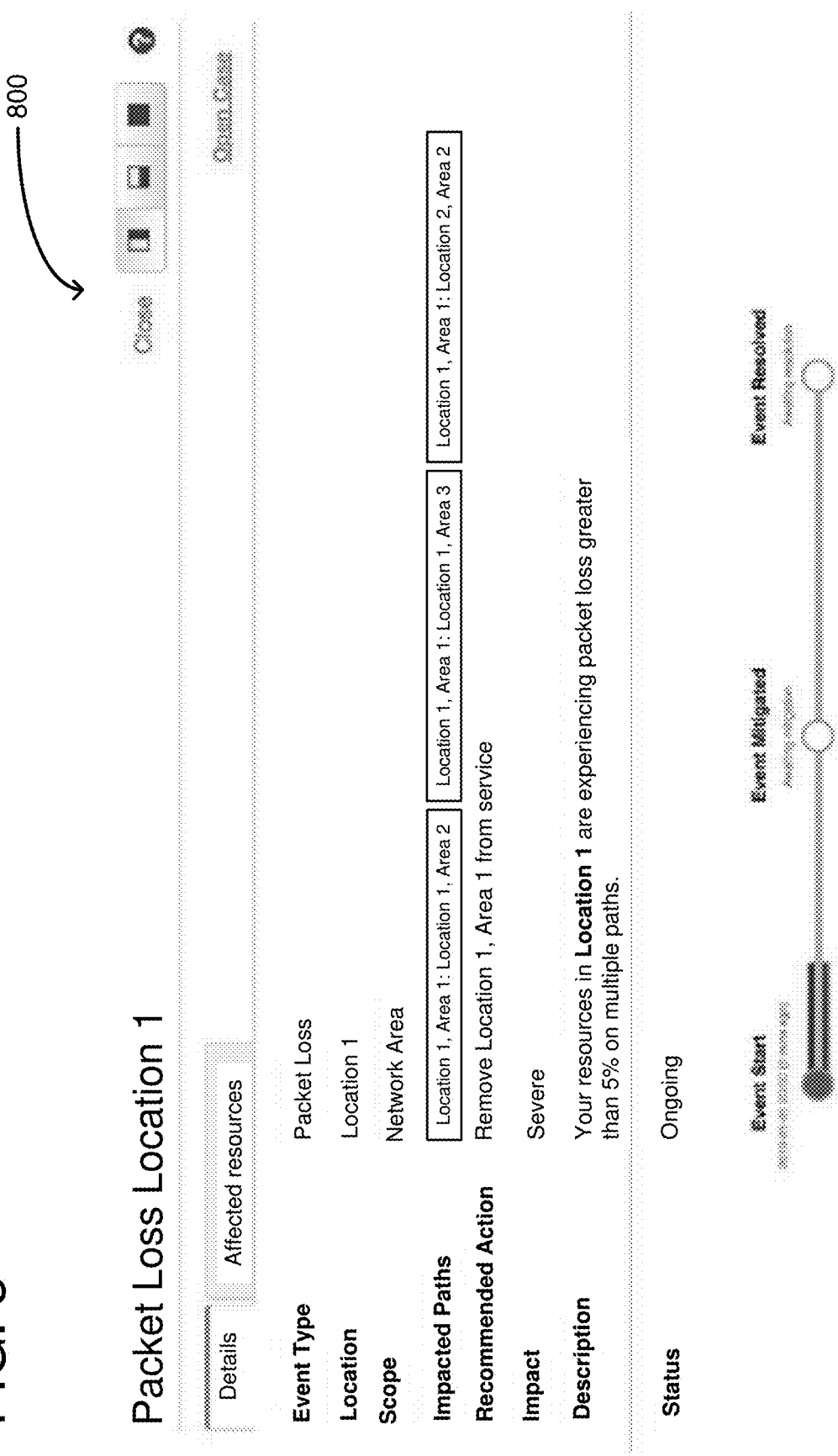
FIG. 8 shows an example user interface for displaying detailed information regarding a particular adverse network event to a user.
Figure 9:
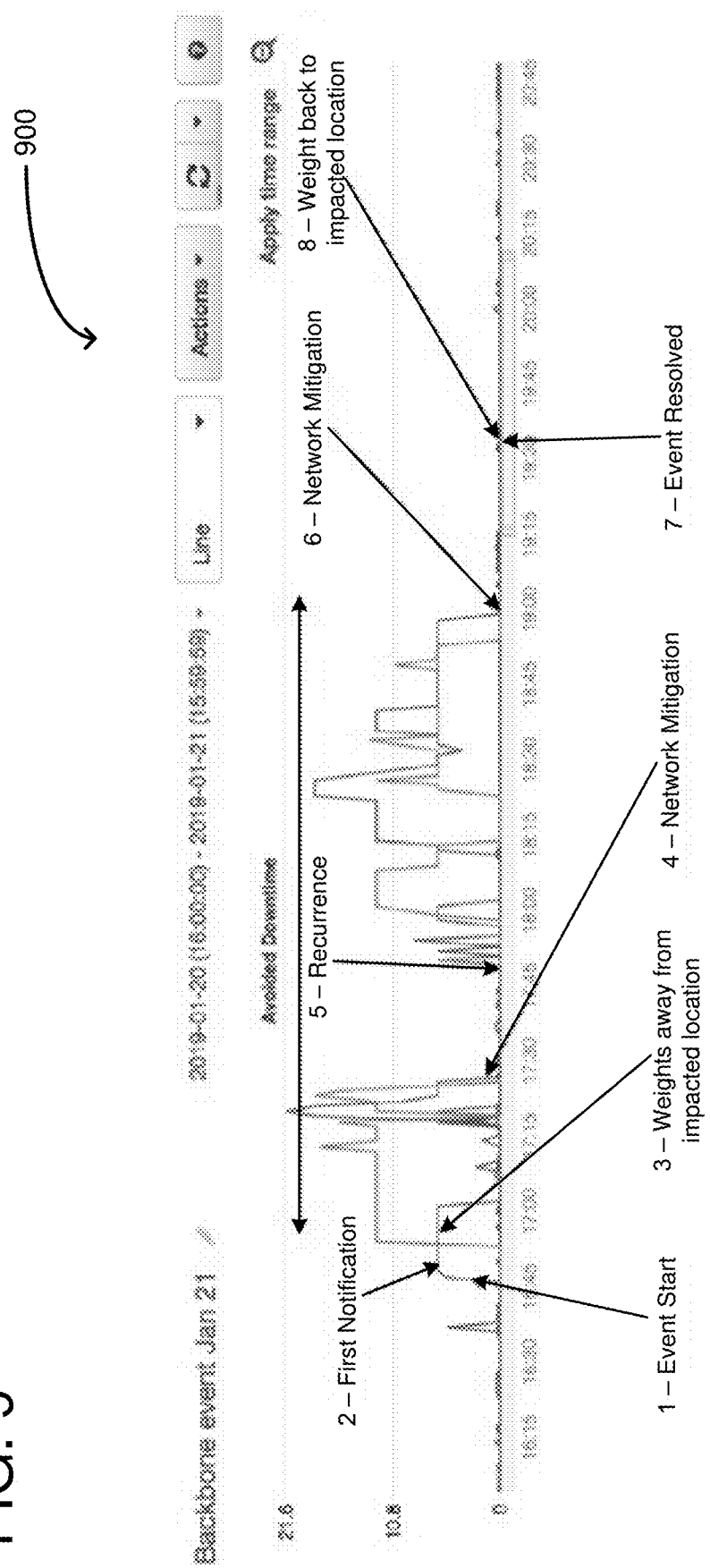
FIG. 9 shows an example timeline of actions taken to mitigate and resolve an adverse network event.

Outputs produced by the user impact attribution sub-service 118 are also provided to the optional notification generation sub-service 122. Notification generation sub-service 122 can generate and output notifications to impacted users 128. For example, the notifications can be provided to user interfaces (UIs) accessible to the users. Example UIs for providing such notifications to users are shown in FIGS. 8 and 9. In some examples, the notifications provided to the impacted users can provide a narrative description of the adverse network event, which can include an indication of one or more of the nature of the adverse network event, the severity of the adverse network event, the network areas affected by the adverse event, the network paths impacted by the adverse network event, the scope of the adverse network event, or the current status of the adverse network event.

In other examples, the monitoring service 102 can receive different inputs and/or produce different outputs. Similarly, the monitoring service 102 can include additional sub-services, or can omit some of the depicted sub-services, without departing from the scope of this disclosure.

Figure 2:
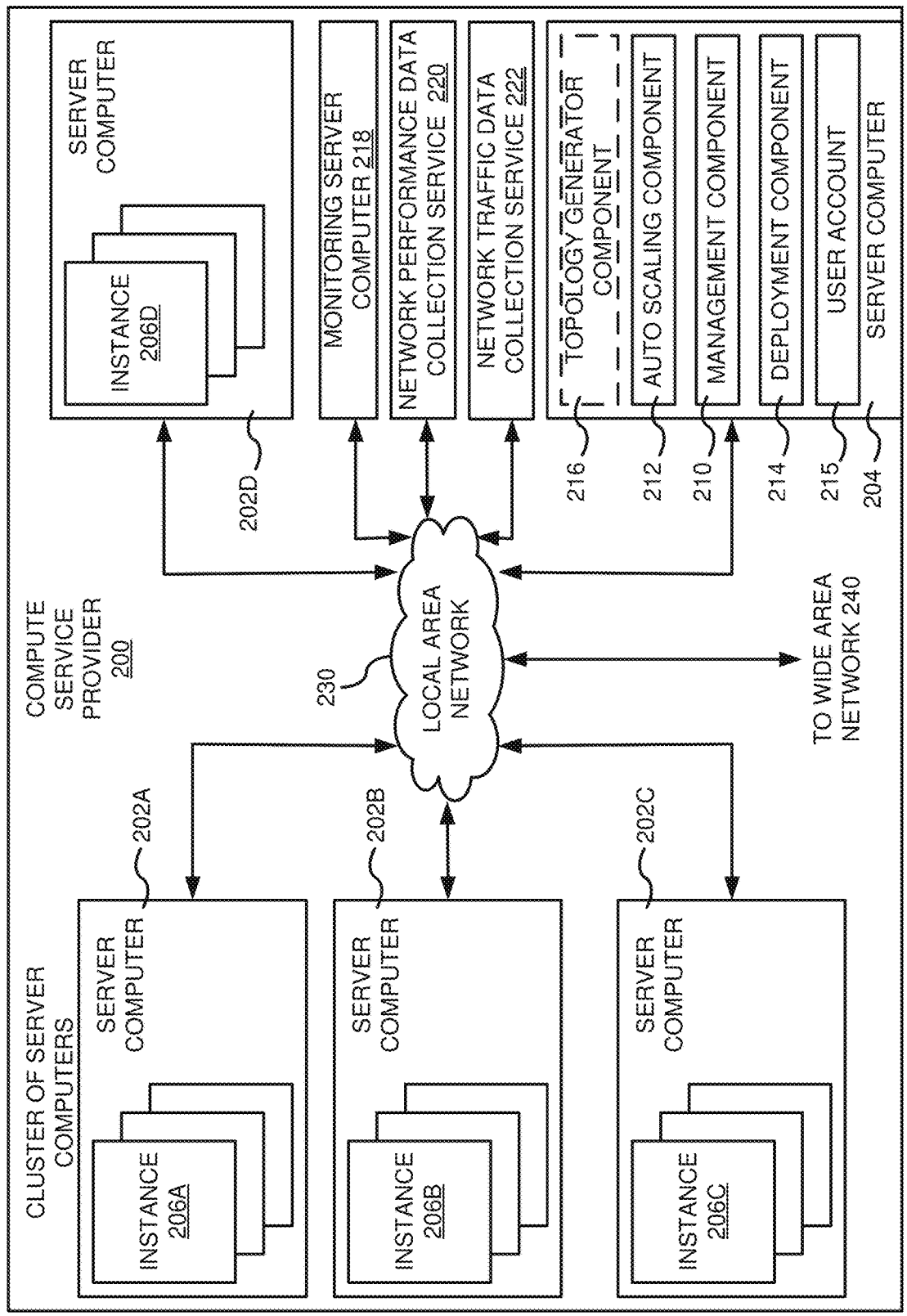
FIG. 2 shows an example system diagram showing a plurality of virtual machine instances running in a multi-tenant environment.

FIG. 2 is a computing system diagram of a network-based compute service provider 200 that illustrates one environment in which embodiments described herein can be used. By way of background, the compute service provider 200 (e.g., the cloud provider) is capable of delivery of computing and storage capacity as a service to a community of end recipients, alternatively referred to herein as users. In an example embodiment, the compute service provider can be established for an organization by or on behalf of the organization. That is, the compute service provider 200 may offer a "private cloud environment." In another embodiment, the compute service provider 200 supports a multi-tenant environment, wherein a plurality of users operate independently (i.e., a public cloud environment). Generally speaking, the compute service provider 200 can provide the following models: Infrastructure as a Service ("IaaS"), Platform as a Service ("PaaS"), and/or Software as a Service ("SaaS"). Other models can be provided. For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

While FIG. 2 shows an example in which a compute service provider implements a monitoring service for its users, the monitoring service can be implemented in other scenarios as well without departing from the scope of this disclosure. For example, the monitoring service can be implemented in on-premise data centers or outsourced data centers, local area networks, etc. In such examples, the users of the monitoring service can be specific network services, rather than users (e.g., customers) of a compute service provider.

The particular illustrated compute service provider 200 includes a plurality of server computers 202A-202D. While only four server computers are shown, any number can be used, and large centers can include thousands of server computers. The server computers 202A-202D can provide computing resources for executing software instances 206A-206D. In one embodiment, one or more of the instances 206A-206D are virtual machines. As known in the art, a virtual machine is an instance of a software implementation of a machine (i.e. a computer) that executes applications like a physical machine. In the example of virtual machine, each of the servers 202A-202D can be configured to execute a hypervisor or another type of program configured to enable the execution of multiple instances 206 on a single server. Additionally, each of the instances 206 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. For example, one or more of the instances 206A-206D can be physical machines (e.g., bare metal instances).

One or more server computers 204 can be reserved for executing software components for managing the operation of the server computers 202 and the instances 206. For example, the server computer 204 can execute a management component 210. A user can access the management component 210 to configure various aspects of the operation of the instances 206 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 212 can scale the instances 206 based upon rules defined by the user. In one embodiment, the auto scaling component 212 allows a user to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist users in the deployment of new instances 206 of computing resources. The deployment component can have access to account information associated with the instances, such as who is the owner of the account, credit card information, country of the owner, etc. The deployment component 214 can receive a configuration from a user that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the user-provided configuration and cache logic to configure, prime, and launch new instances 206. The configuration, cache logic, and other information may be specified by a user using the management component 210 or by providing this information directly to the deployment component 214. The instance manager can be considered part of the deployment component.

User account information 215 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

As shown, server computer 204 can optionally include a topology generator component 216. In other examples, however, the functionality of the topology generator component can be performed by a different sever computer of the compute service provider, or by an entity other than the compute service provider. The topology generator component 216 can generate network topology data (e.g., network topology data 104 of FIG. 1).

Compute service provider 200 further includes a monitoring server computer 218, a network performance data collection service 220, and a network traffic data collection service 222. Monitoring server computer 218 can host a monitoring service such as monitoring service 102 of FIG. 1. In other examples, however, the monitoring service can be hosted by another server computer, such as server computer 204. While a single monitoring server computer 218 is depicted, the monitoring service can alternatively be implemented by a plurality of server computers.

Network performance data collection service 220 can be implemented by one or more server computers of the compute service provider, or alternatively, one or more server computers external to the compute service provider. Although it is depicted separately from the monitoring server computer 218 and the server computer, network performance data collection service 220 may be implemented by one of those server computers in other examples. Network performance data collection service 220 can serve to collect network performance data (e.g., network performance data 108 of FIG. 1).

Network traffic data collection service 222 can be implemented by one or more server computers of the compute service provider, or alternatively, one or more server computers external to the compute service provider. Although it is depicted separately from the monitoring server computer 218 and the server computer, network traffic data collection service 222 may be implemented by one of those server computers in other examples. Network traffic data collection service 222 can serve to collect network traffic data (e.g., user data flows 106 of FIG. 1).

A network 230 can be utilized to interconnect the server computers 202A-202D, the server computer 204, the monitoring server computer 218, the network performance data collection service 220, and the network traffic data collection service 222. The network 230 can be a local area network (LAN) and can be connected to a Wide Area Network (WAN) 240 so that end users can access the compute service provider 200. It should be appreciated that the network topology illustrated in FIG. 2 has been simplified and that many more networks and networking devices can be utilized to interconnect the various computing systems disclosed herein.

Figure 3:
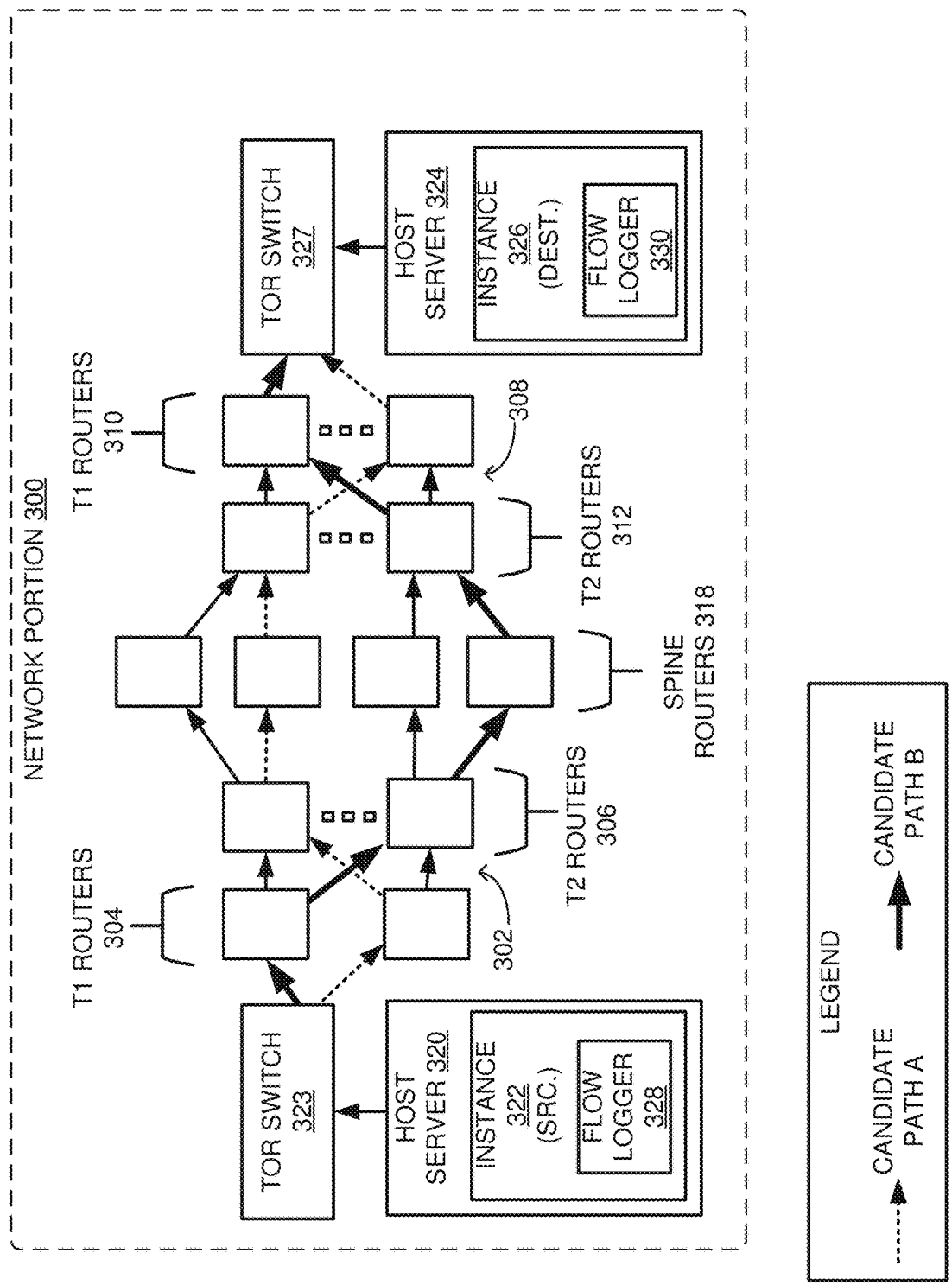
FIG. 3 shows an example system diagram showing a portion of a network.

FIG. 3 illustrates an example network portion 300, which can be a portion of a larger area of a network. The network area can include multiple network devices arranged in various topologies, such as a leaf and spine architecture. In the depicted example, the network devices are arranged in a particular leaf and spine architecture referred to as a Clos-type architecture. A network having a Clos-type architecture can include multiple leaves or bricks, each comprising a plurality of routers, as well as a plurality of spine routers. The individual routers of a brick can be arranged in one or more tiers. A first tier of routers (T1 routers) of a given brick can be connected to clients (e.g., servers hosting virtual machine instances) and to routers of a second tier of routers (T2 routers), but not to other T1 routers. The T2 routers can be connected to spine routers and to T1 routers, but not to other T2 routers. For example, a given T1 router of a brick can be connected directly to all of the T2 routers of that brick using different respective physical network links. A given T2 router of a brick can be connected directly to one or more of the spine routers using different respective physical network links. Thus, connections between the different bricks can be indirect through the spine routers.

In particular, the depicted network portion 300 includes a first brick 302 including T1 routers 304 and T2 routers 306, a second brick 308 including T1 routers 310 and T2 routers 312, and a plurality of spine routers 318. The first and second bricks 302 and 304 can connect to the spine using various topologies. In the depicted non-limited example, each of the T2 routers of the respective bricks connect to a different router of the spine. While a single column of spine routers 318 is shown in network portion 300, other examples can include multiple columns of spine routers, with each column including one or more routers that provides an alternative path from one brick to another brick through the network area. In such examples, the different columns can be used to distribute the network traffic between the different bricks to provide redundancy and increase the capacity between the bricks. For example, each column can be given an equal weight and packets can be forwarded between the bricks and across the spine using ECMP routing.

The bricks can connect to various clients. In the depicted example, the first brick 302 is connected to a host server 320 hosting a virtual machine instance 322 via a top-of-rack (TOR) switch 323. Similarly, the second brick 308 is connected to a host server 324 hosing a virtual machine instance 326 via a TOR switch 327. The TOR switches 323 and 327 can each be connected to other host servers (not shown), such that multiple host servers use the same TOR switch to communicate with the T1 bricks. While a single virtual machine instance is shown for each server for ease of description, each server may in fact host a plurality of such instances. Instances 322 and 326 can be examples of instances 206A-D shown in FIG. 2, for example.

Host server 320 and host server 324 can each include underlying hardware including one or more CPUs, memory, storage devices, etc. Running a layer above the hardware is a hypervisor or kernel layer. The hypervisor or kernel layer can be classified as a type 1 or type 2 hypervisor. A type 1 hypervisor runs directly on the host hardware to control the hardware and to manage the guest operating systems, whereas a type 2 hypervisor runs within a conventional operating system environment. Thus, in a type 2 environment, the hypervisor can be a distinct layer running above the operating system and the operating system can interact with the system hardware. Different types of hypervisors include Xen-based, Hyper-V, ESXi/ESX, Linux, etc., but other hypervisors can be used. The host servers can include a management layer, which can be part of the hypervisor or separated therefrom and generally includes device drivers needed for accessing the hardware. Further, the host servers can each be partitioned into a plurality of partitions, which are logical units of isolation, by the hypervisor. Each partition can be allocated its own portion of the hardware layer's memory, CPU allocation, storage, etc. Additionally, each partition can include a virtual machine instance (e.g., instance 322 or 326) and its own guest operating system. As such, each partition is an abstract portion of capacity designed to support its own virtual machine independent of the other partitions.

As shown, instance 326 includes a flow logger 328. Similarly, instance 326 includes a flow logger 330. Flow loggers 328 and 330 can include software configured to collect information regarding data flows that involve the instances on which they are executed. The collected information can include user data flows such as user data flows 106 of FIG. 1, for example. The flow loggers can transmit the collected information to a monitoring service, such as monitoring service 102 of FIG. 1. In other examples, however, each server (rather than each instance) can include a flow logger for the instances hosted thereon. Alternatively, the flow loggers can be implemented on routers (e.g., one or more of the T1 or T2 routers) to provide router-side flow logging.

The flow logs generated by the flow loggers can include information such as respective source ports of user data flows, respective destination ports of user data flows, respective transport protocols of user data flows, virtual machine instance identifiers associated with user data flows, respective numbers of packets transferred in user data flows, or respective transport protocol status flags for user data flows.

As indicated, instance 322 is the source of a data flow in the depicted example, whereas instance 326 is the destination of the data flow. In particular, network packets constituting the data flow can transit through network portion 300 from instance 322 to instance 326. The particular path through the various T1, T2, and spine routers that will be taken by the network packets depends on various factors, including the routing strategy being used (e.g., ECMP routing). While flow loggers 328 and 330 collect information regarding data flows involving the instances on which they are executed, the flow loggers may not have the capability to collect information on the exact path through the network portion taken by the network packets of the data flows. Put another way, while it may be possible to determine all possible paths from the source of the data flow to the destination of the data flow by analyzing the information collected by the flow loggers, e.g., in conjunction with network topology data (and optionally, other data), it may be more difficult to definitively know which of the paths was actually taken by a particular data flow. Accordingly, various methods may be used to determine candidate paths, e.g., paths that may have been taken by the data flow.

In the depicted example, as indicated by the legend, a candidate path A for a data flow from instance 322 to instance 326 is shown by dotted-line arrows, and a candidate path B for the same data flow is shown by bold arrows. Candidate paths A and B are provided for the sake of example, and are not meant to be limiting; alternative and/or additional candidate paths through the network portion from instance 322 to instance 326 may also exist. Upon receiving data collected by flow loggers 328 and 330 (e.g., in the form of user data flows), as well as other data such as network topology data, a monitoring service such as monitoring service 102 of FIG. 1 can determine all paths through the network portion that may have been taken by the logged user data flows. The monitoring service can then use a strategy such as probabilistic determination to narrow down the paths to one or more candidate paths through the network portion that were likely traversed by the user data flows.

Figure 4:
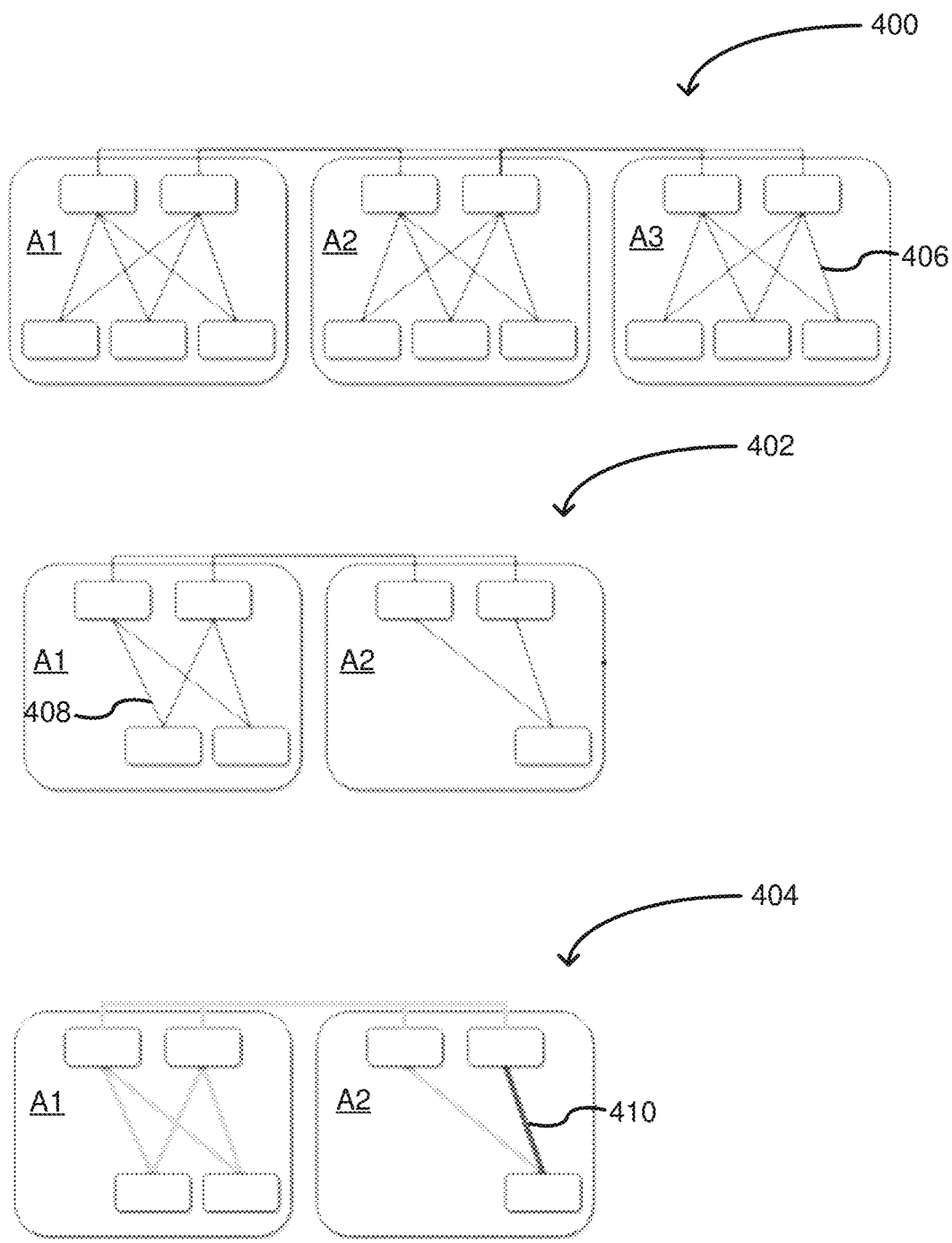
FIG. 4 shows an example of a full regional network topology, a subgraph of the network topology, and an enriched version of the subgraph which incorporates network performance data.

FIG. 4 illustrates examples of a full regional network topology 400, a subgraph 402 of the full regional network topology for a particular user, and a subgraph 404 which is an enriched version of subgraph 404 and includes link health information determined based on network performance data. In some examples, network topology 400 can generated by a routing model generator such as routing model generator sub-service 112 of FIG. 1, based on network topology data. Network topology 400 can be "trimmed" to a subgraph that only reflects network devices and links used by a particular user, such as a subgraph 404, using a user network exposure generator such as user network exposure generator sub-service 116 of FIG. 1. The subgraph can then be enriched with network performance data, such as network performance data 108 of FIG. 1, to produce an enriched subgraph such as subgraph 404. The enriched subgraph can be generated by a user impact attribution sub-service such as user impact attribution sub-service 118 of FIG. 1. For example, network performance data can be mapped to/superimposed onto to the subgraph for a specific user to determine whether, and to what extent, adverse network events or conditions affect that user's network traffic.

In the depicted example, full regional network topology 400 represents the topology of a portion of a communications network that includes three interconnected network areas: A1, A2, and A3. Each area can include a plurality of network devices, or groups of network devices (e.g., bricks), interconnected by links; for example, each area can include multiple network portions similar to network portion 300 of FIG. 3. Each area of network topology 400 includes a plurality of paths between network devices; one such path is indicated at 406. These paths can represent all possible paths between the network devices.

In contrast, subgraph 402 is an example of "trimmed" version of network topology 400, which only includes network devices and links associated with a particular user's network traffic. Such a subgraph can be generated by a monitoring service (e.g., monitoring service 102 of FIG. 1) based on network traffic data for the user (e.g., user data flows) and network topology data. This can alternatively be referred to as determining the user's exposure to the network. For example, the monitoring service can use the network traffic data to identify all network devices (or groups of network devices) and links between network devices that may have been traversed by the user's data flows. For example, the monitoring service can correlate source and destination IP addresses in the user data flows to physical network devices based on the network topology data. Further, the monitoring service can infer probable paths between the network devices traversed by the user data flows based on various criteria, such as the routing protocol associated with the data flows. The monitoring service can then generate the subgraph by omitting network devices/ groups of network devices of network topology 400 that were not associated with any of the user data flows, as well as omitting paths that were not possibly traversed by any of the user data flows. The remaining paths can be referred to as candidate paths; a plurality of candidate paths, which correspond to a subset of the paths of network topology 400, are shown in subgraph 402. One such path is indicated at 408.

In the depicted example, subgraph 402 indicates that the user had network traffic in A1 and A2 but not A3. Further, certain network devices and paths included in A1 and A2 of network topology 400 are omitted from A1 and A2 in subgraph 402; this indicates that only the remaining network devices were determined to have been used by the user, and that only the remaining paths were determined to be candidate paths that were possibly traversed by that user's network traffic.

Subgraph 404 is an enriched version of subgraph 402, in that it is enriched with network performance data, and optionally with data received from a network incident management system, in order to reveal whether any portions of the network that are of interest to the user are impacted by an adverse network event such as an outage. "Enriching" subgraph 402 with network performance data can refer to mapping the network performance data on the subgraph. As discussed above, the network performance data can quantify the impact of ongoing adverse events/incidents on the network. Further, a network incident management system such as network incident management system 109 of FIG. 1 can receive alerts/messages associated with one or more particular logical groups of network devices impacted by an adverse network event; a logical group of network devices can be referred to as a "container." The network devices in a given container can have common geographic and/or functional qualities; in some examples, a container can correspond to a "brick" (e.g., two layers of routers connected in a specific way to perform a specific function), and can be located in the same rack within a datacenter. In this context, the mapping of the network performance data on the subgraph can include comparing the container(s) of known impacted devices to the portions of the network that are of interest to the user (e.g., the user's subgraph of the network topology), to determine whether there is any intersection of the container(s) with the user's subgraph.

In the depicted example, as a result of the mapping, it is determined that one of the paths in A2 may be impacted by an adverse network event (e.g., this path is not a "healthy" link). The impacted path is indicated at 410. Having made this determination, the monitoring service can then take actions to reduce the impact of the adverse network event on the user. These actions can include automatically redirecting the user's resources to a healthy (unimpacted) portion of the network, or notifying the user of the issue and recommending mitigating actions that the user can voluntarily take to address the issue.

Figure 5:
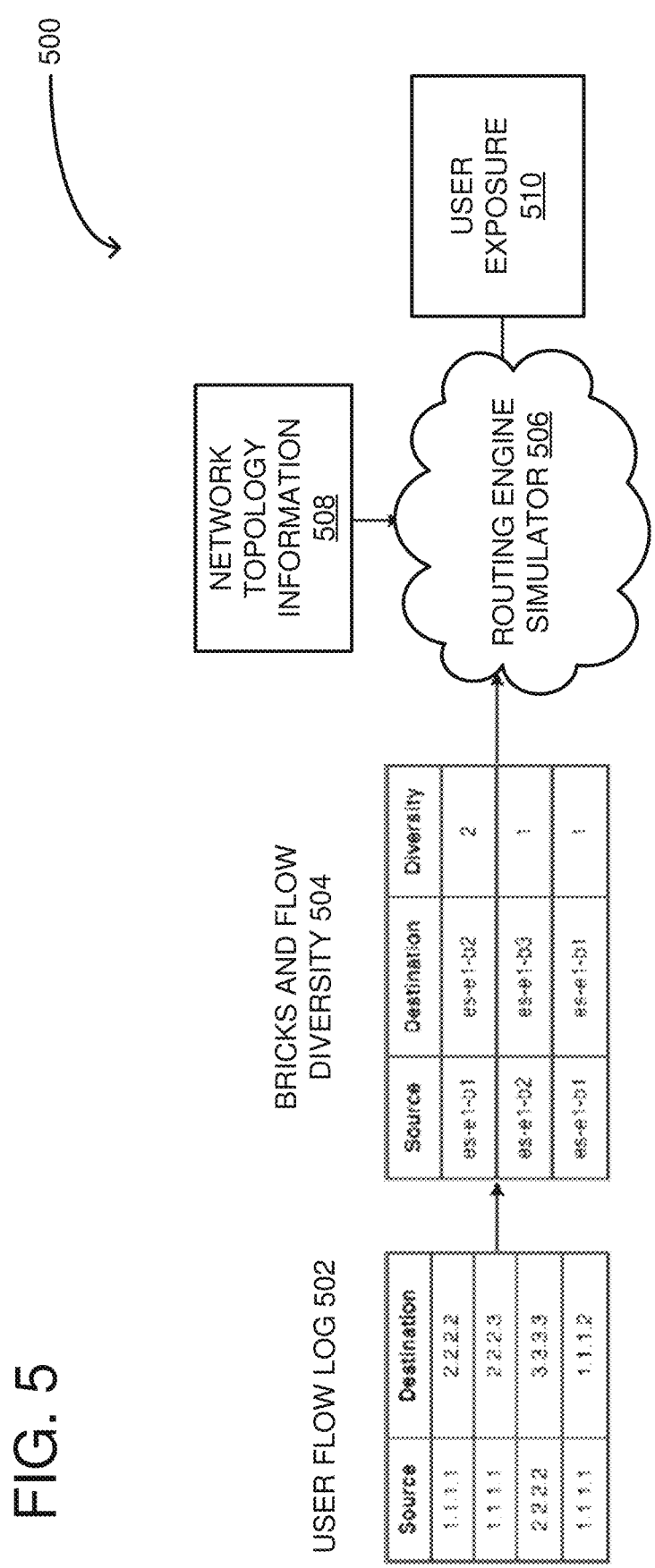
FIG. 5 shows an example diagram of a process for determining a user's exposure to a network.

FIG. 5 illustrates an example diagram 500 of a process for determining a user's exposure to a network based on the user's network traffic data and network topology information. This determination can be performed by a monitoring service such as monitoring service 102 of FIG. 1.

Diagram 500 includes a tabular representation of a user flow log 502. In the depicted example, user flow log 502 includes a plurality of pairs of source and destination addresses. The source addresses can each indicate a physical network device or brick at which a user data flow originated (or, from which a user data flow was forwarded), whereas the destination addresses can each indicate a physical network device or brick that served as an endpoint for a user data flow. In other examples, a user flow log can include additional information (e.g., a 5-tuples for each user data flows and/or other information); a relatively simple user flow log is shown for the sake of example.

As shown, user flow log 502 serves as an input to a tabular representation of bricks and flow diversity 504. In particular, the source and destination addresses for each of the user data flows in flow log 502 are replaced by identifiers of corresponding bricks in table 504. Table 504 also includes an indication of flow diversity for each user data flow. The user data flow in the top row of table 504 has a diversity of 2, whereas the user data flows in the bottom two rows of table 504 each have a diversity 1. A higher flow diversity for a given user data flow can indicate that the user's network traffic between the corresponding source and destination bricks tends to take a larger number of different paths, whereas a lower flow diversity can indicate a tendency of the user's network traffic between the corresponding source and destination bricks to flow along a smaller number of different paths. In some examples, the flow diversity information for a given user data flow can be gleaned from analysis of multiple user data flows between the same source and destination.

Table 504 in turn serves as an input to a routing engine simulator 506. Routing engine simulator 506 can be a sub-service of a monitoring service, for example. As shown, routing engine simulator 506 also receives network topology information 508. The routing engine simulator 506 then determines an exposure of the user to the network based on (e.g., based at least in part on) these inputs. User exposure 510 can be a subgraph of a full network topology, which omits portions of the full network topology that were not possibly used by the user's network traffic. Upon determining user exposure 510, a monitoring service can perform additional determinations to assess whether the portions of the network to which the user exposed are impacted by any adverse network events (e.g., in the manner discussed above with reference to FIG. 4).

Figure 6:
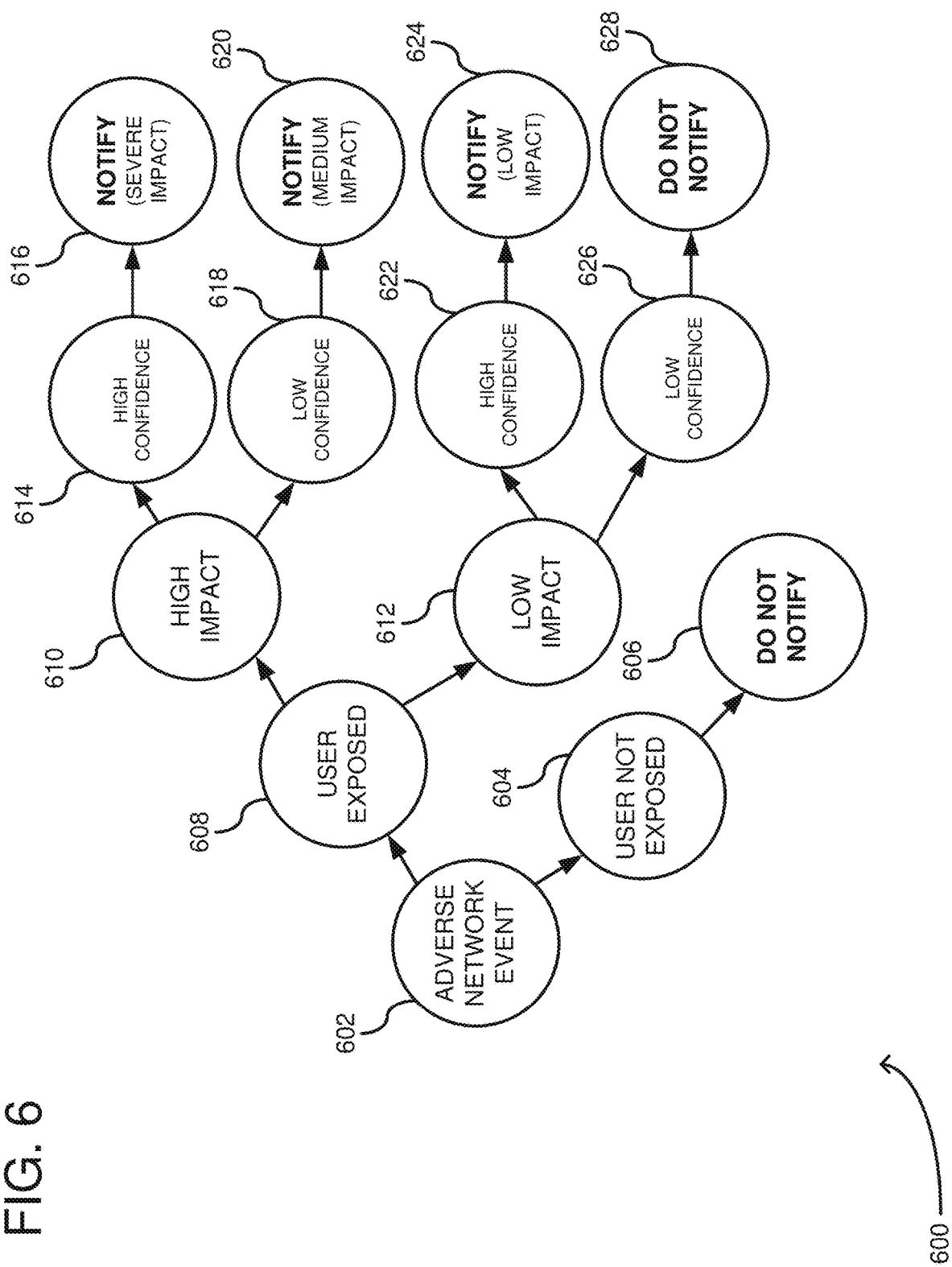
FIG. 6 shows an example diagram of a process for determining whether and how to notify a user of an adverse network event.

FIG. 6 depicts an example diagram 600 of a process for determining whether and how to notify a particular user of a network of an adverse network event. The determination can be performed by a monitoring service such as monitoring service 102 of FIG. 1, for example. The depicted process is just one example of how the determination could be performed; other processes can instead be used without departing from the scope of this disclosure. Similarly, while diagram 600 shows three impact levels (low, medium, and severe), this is just one example; other gradations of impact levels can instead be used.

At 602, an adverse network event is detected. At 604, it is determined (e.g., via a monitoring service) that the user in question was not exposed to the adverse network event. For example, this determination can include the monitoring service mapping network performance data, which includes data regarding portions of the network affected by the adverse network event, to a subgraph of the network topology to which the user's network traffic is exposed, and determining that the user's network traffic does not traverse any of the portions of the network affected by the adverse network event. In this case, it is indicated at 606 that the user should not be notified of the adverse event.

In contrast, at 608, it is determined that the user in question was in fact exposed to the adverse network event. The monitoring service can then assess the impact of the adverse network event on the user. The extent to which the user was exposed to the adverse network event can be determined based on a number of a network devices and/or links impacted by the adverse network event to which the user's network traffic was exposed, and/or on other factors such as the quantity of network traffic associated with the user in the affected area of the network, the flow diversity of the user's network traffic, etc. At 610, it is determined that the adverse network event had a high impact on the user's network traffic. The level of confidence with which the impact of the adverse network event on the user was determined is then assessed. In some examples, the level of confidence is determined based on (e.g., based at least in part on) the quantity of network traffic associated with the user in the affected area of the network and/or the flow diversity of the user's network traffic, with a higher quantity of network traffic and a higher flow diversity increasing the level of confidence in the determined impact level. At 614, a high confidence level is determined. This leads to notification of the user of severe impact from the adverse network event at 616. In contrast, at 618, a low confidence level is determined, which leads to notification of the user of medium impact from the adverse network event at 620.

Returning to 608, if it is instead determined that the adverse network event had a low impact on the user's network traffic at 612, the confidence level of this determination is then assessed in a similar manner. If the determination of the low impact was made with high confidence at 622, the user is notified of a low impact from the adverse network event at 624. If, on the other hand, the determination of the low impact was made with low confidence at 626, the user is not notified of the adverse network event, as indicated at 628.

Figure 7:
FIG. 7 shows an example user interface for displaying notifications regarding adverse network events to a user.

FIG. 7 illustrates an example UI 700 for displaying notifications regarding adverse network events to a user. For example, an administrator associated with the user can access UI 700 to view a list of adverse network events known to an administrator of the network (e.g., a compute service provider). In the depicted example, UI 700 includes an Event Type column, a Status column, a Location column, a Start Time column, an Affected Resources column, and an Impact column. In other examples, fewer columns or additional columns can be included in UI 700.

The Event Type column includes a brief narrative characterizing the type of each adverse network event. The Status column indicates whether each event has a status of "Open" or "Closed." The Location column indicates the location(s) within the network affected by each event. The Start Time column indicates the time at which each event began. The Affected Resources column indicates the quantity and type of resources affected by each event, or indicates that this information is unknown. The Impact column indicates whether the impact of the event is potential or confirmed.

FIG. 8 illustrates an example UI 800 for displaying detailed information regarding a particular adverse network event to a user. For example, an administrator associated with the user can access UI 800 to view detailed information regarding a particular adverse network event known to the compute service provider (or to another entity implementing the monitoring service). As shown, UI 800 includes a Details tab (shown) and an Affected Resources tab. On the displayed Details tab, details are provided for a packet loss event affecting a location within the network referred to as Location 1. The scope of the event is indicated to be "Network Area," meaning that the event is believed to affect an entire network area within Location 1. A list of paths through the network affected by the event is also provided.

As shown, UI 800 provides a Recommended Action, which is to "Remove Location 1, Area 1 from service." The UI further indicates that the event has a Severe impact, and provides a narrative description of the event which states that "Your resources in Location 1 are experiencing packet loss greater than 5% on multiple paths." The status of the event is indicated to be "Ongoing." In addition, the UI includes a status bar showing the event's progress. As shown, the event has started but has not yet been mitigated or resolved.

FIG. 9 shows an example timeline 900 of actions taken to mitigate and resolve an adverse network event. The actions shown in timeline 900 can be taken by an administrator of a network, such as a compute service provider, either alone or in conjunction with one or more users of the network. The X-axis of timeline 900 represents time, and the Y-axis of timeline 900 represents percentage of packet loss, which can alternatively be referred to as a packet loss rate. The original version of timeline 900 includes different colored graphs representing different network paths experiencing packet loss; these details may be difficult to discern in the black and white version shown in FIG. 9.

As indicated at 1, an adverse network event started at approximately 16:45 on Jan. 20, 2019 at a location within a network. As indicated at 2, a first notification of the event was provided (e.g., to one or more affected users) shortly thereafter. As indicated at 3, user resources were then weighted away from the impacted location to avoid down-time. As indicated at 4, network mitigation is performed shortly before 17:30 to address the issue at the impacted location. However, as indicated at 5, the event recurs and continues until further network mitigation is performed at approximately 19:00, as indicated at 6. As indicated at 7, the event is resolved at approximately 19:30. As indicated at 8, upon resolution of the event, user resources are weighted back to the impacted location.

Figure 10:
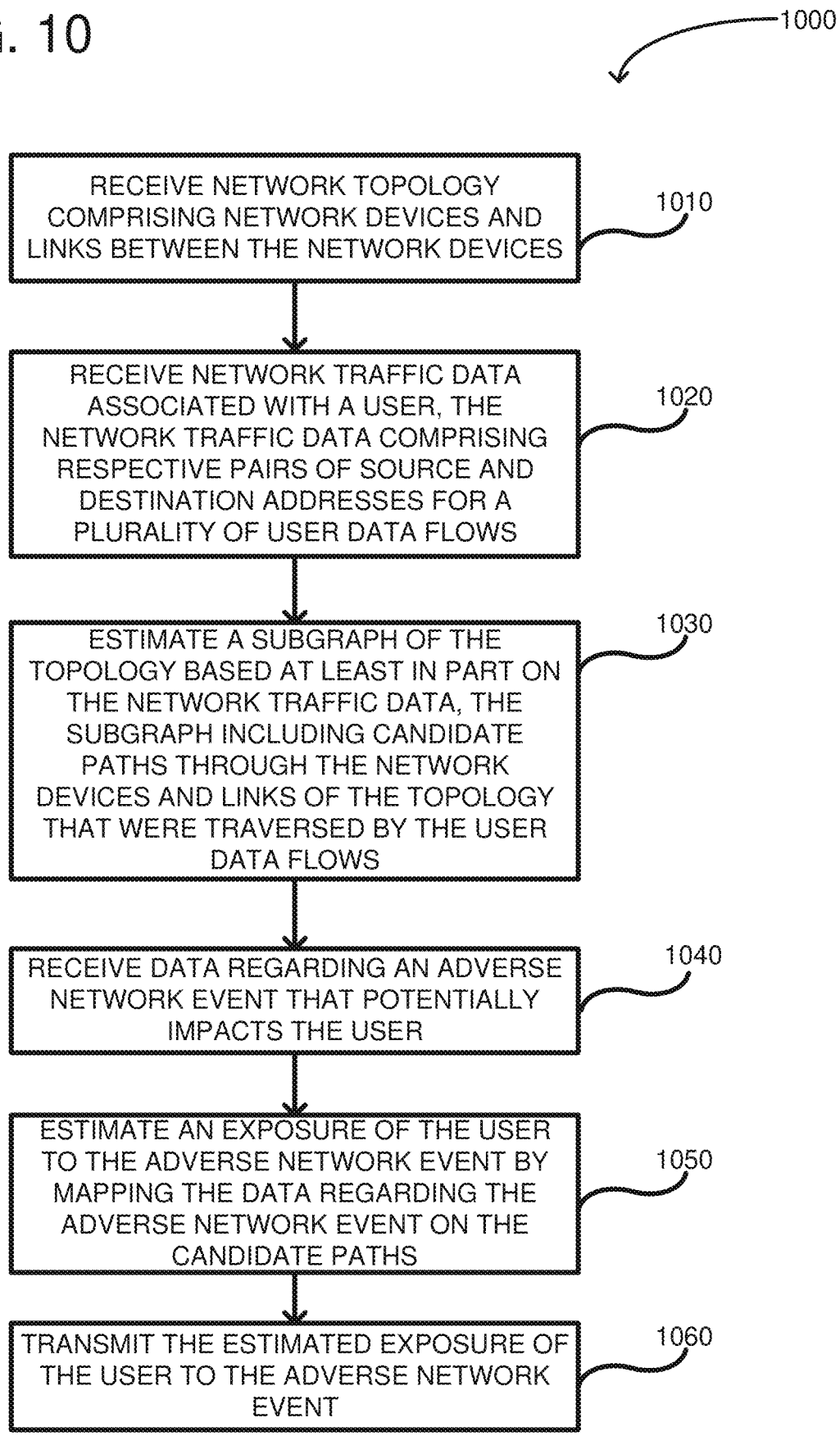
FIG. 10 is a flowchart of an example method of estimating an exposure of a user of a network to an adverse network event.

FIG. 10 is a flowchart 1000 according to one embodiment for estimating an exposure of a user of a network to an adverse network event. The various actions performed in flowchart 1000 can be performed by a monitoring server (e.g., monitoring server computer 218 of FIG. 2), or by another component. In some examples, the user is a user of a compute service provider and is associated with one or more virtual machine instances running on hypervisors. In other examples, the user is associated with a network service/application and/or the user is associated with one or more physical (non-virtual) machines.

In process block 1010, a network topology comprising network devices and links between the network devices is received. The received network topology can take various forms, and is not limited to a graphical representation of a network. For example, a network topology can be a collection of raw data, or data in a tabular format.

In process block 1020, network traffic data associated with a user of the network is received, the network traffic data comprising respective pairs of source and destination addresses for a plurality of user data flows. Additional network traffic data can also be received without departing from the scope of this disclosure. The additional network traffic data can include, for example, a flow diversity associated with a given user data flow as shown in FIG. 5, and/or one or more probing rates for the user (e.g., respective user probing rates for one or more links). A user probing rate can represent a frequency at which the packets associated with the user are traversing a specified portion (e.g., area) of the network. A given user may traverse different areas of a network with different frequencies: for example, the user may direct one packet per hour through a first area of the network, while directing one packet per second through a second, different area of the network.

In process block 1030, a subgraph of the topology is estimated based on (e.g., based at least in part on) the network traffic data, the subgraph including candidate paths through the network devices and links of the topology that were traversed by the user data flows.

In process block 1040, data regarding an adverse network event that potentially impacts the user is received.

In process block 1050, an exposure of the user to the adverse network event is estimated by mapping the data regarding the adverse network event received at process block 1040 on the candidate paths.

In process block 1060, the estimated exposure of the user to the adverse network event determined at process block 1050 is transmitted to the user.

Figure 11:
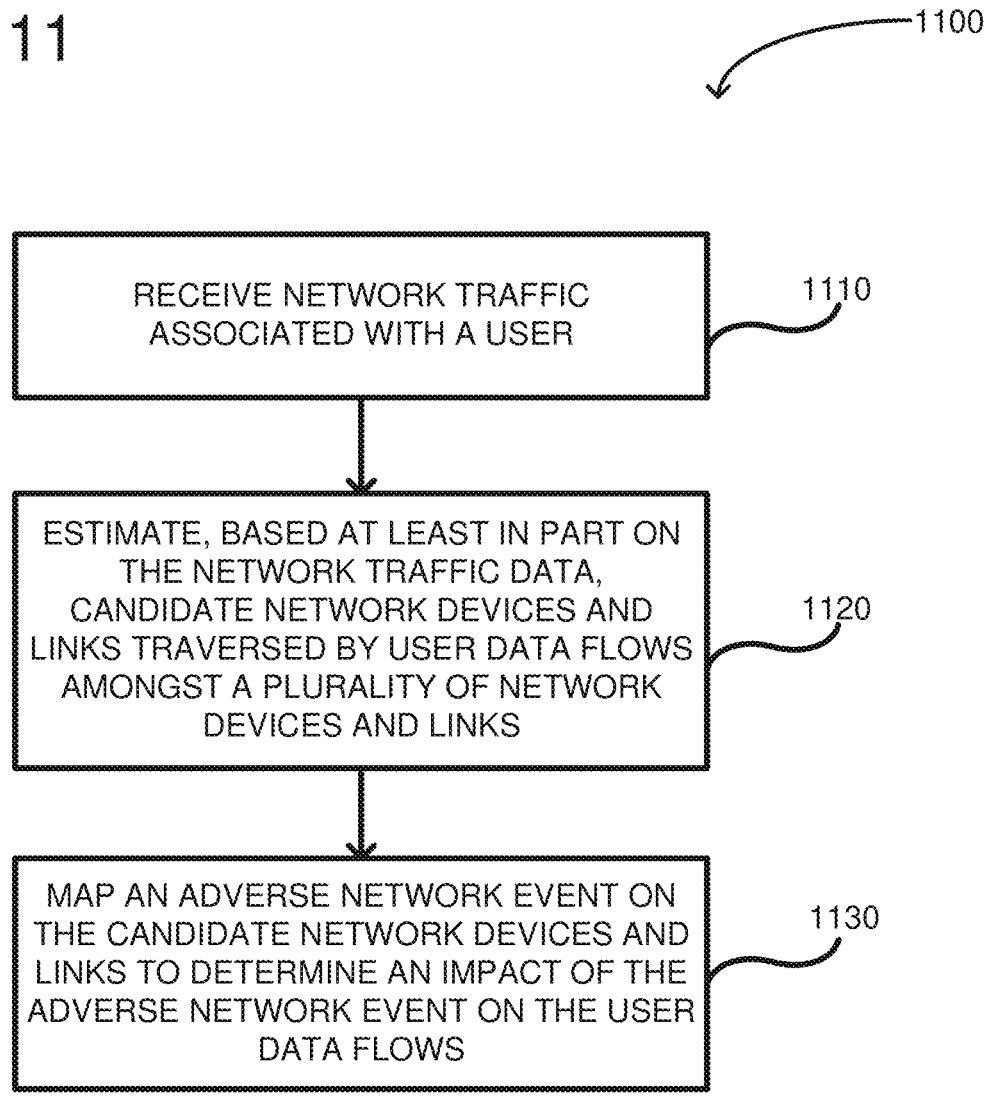
FIG. 11 is a flowchart of an example method of determining an impact of an adverse network event on data flows of a user.

FIG. 11 is a flowchart 1100 according to one embodiment for determining an impact of an adverse network event on data flows of a user. The various actions performed in flowchart 1100 can be performed by a monitoring server (e.g., monitoring server computer 218 of FIG. 2), or by another component. In some examples, the user is a user of a compute service provider and is associated with one or more virtual machine instances running on hypervisors. In other examples, the user is associated with a network service/application and/or is associated with one or more physical (non-virtual) machines.

In process block 1110, network traffic associated with a user is received.

In process block 1120, candidate network devices and links traversed by user data flows amongst a plurality of network devices and links are estimated. The estimate is based on (e.g., based at least in part on) the network traffic data received at process block 1110.

In process block 1130, an adverse network event is mapped on the candidate network devices and links to determine an impact of the adverse network event on the user data flows.

Figure 12:
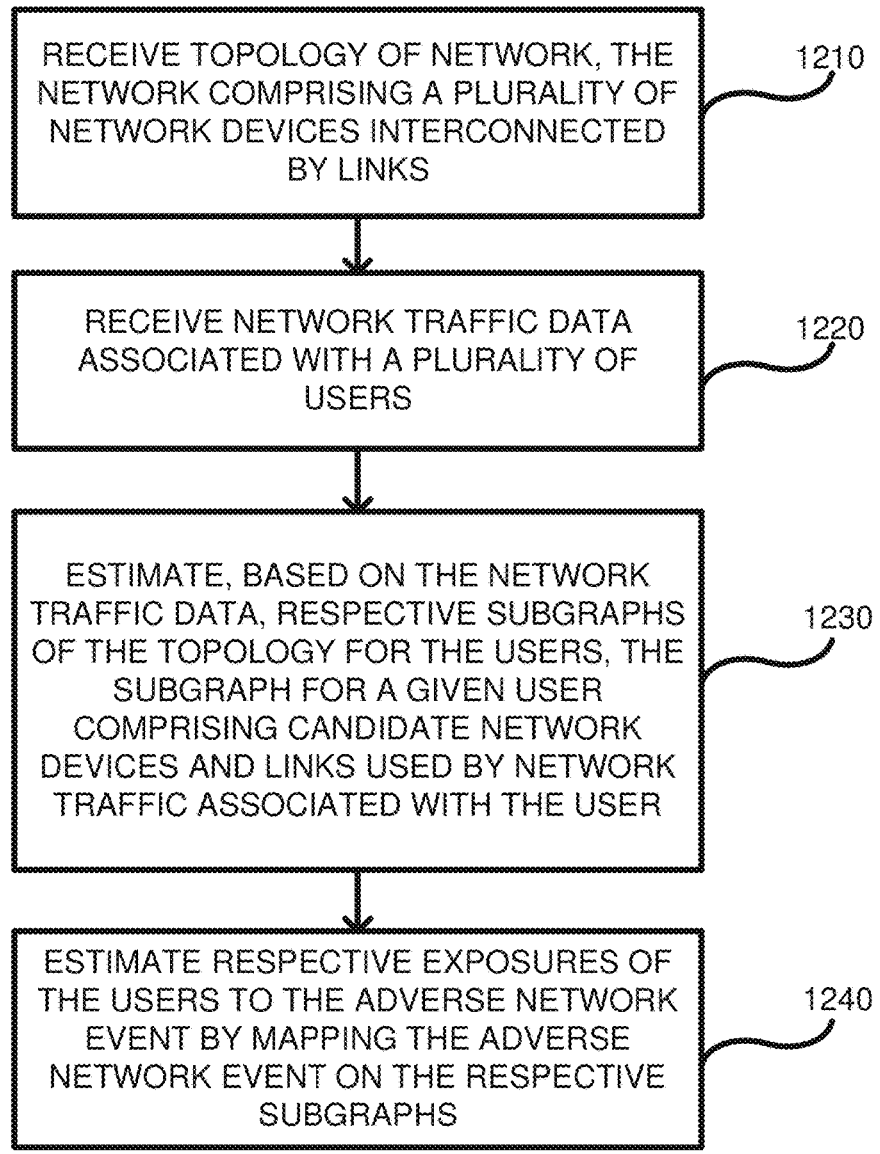
FIG. 12 is a flowchart of an example method for estimating respective exposures of a plurality of users to an adverse network event.

FIG. 12 is a flowchart 1200 according to one embodiment for estimating respective exposures of a plurality of users to an adverse network event. In some examples, the various actions performed in flowchart 1200 can be performed by a monitoring server (e.g., monitoring server computer 218 of FIG. 2). In some examples, the users are users of a compute service provider and are associated with virtual machine instances running on hypervisors. In other examples, the users are network services/applications or other types of users, and are associated with physical (non-virtual) machines.

In process block 1210, a topology of a network is received. The network comprises a plurality of network devices interconnected by links.

In process block 1220, network traffic data associated with a plurality of users is received.

In process block 1230, respective subgraphs of the topology are estimated for the users based on (e.g., based at least in part on) the network traffic data. The subgraph for a given user can include candidate network devices and links used (e.g., exercised/traversed) by network traffic associated with the user.

In process block 1240, respective exposures of the users to the adverse network event are estimated by mapping the adverse network event on the respective subgraphs.

In some examples, the monitoring sever can be further operable to filter the users based on their estimated exposure to the adverse network event to identify a subset of users impacted by the adverse network event. The monitoring server can then transmit a signal to the subset of users regarding the adverse network event. Transmitting the signal to the subset of users regarding the adverse network event can include notifying the subset of users of the adverse network event and providing the subset of users with one or more recommended actions to take responsive to the adverse network event.

Optionally, the estimation of the respective exposures of the users to the adverse network event performed in process block 1240 can include determining one or more network areas affected by the adverse network event. In such an example, the monitoring server can be further operable to adjust operation of the network to redirect user data flows away from the one or more network areas affected by the adverse network event.

Figure 13:
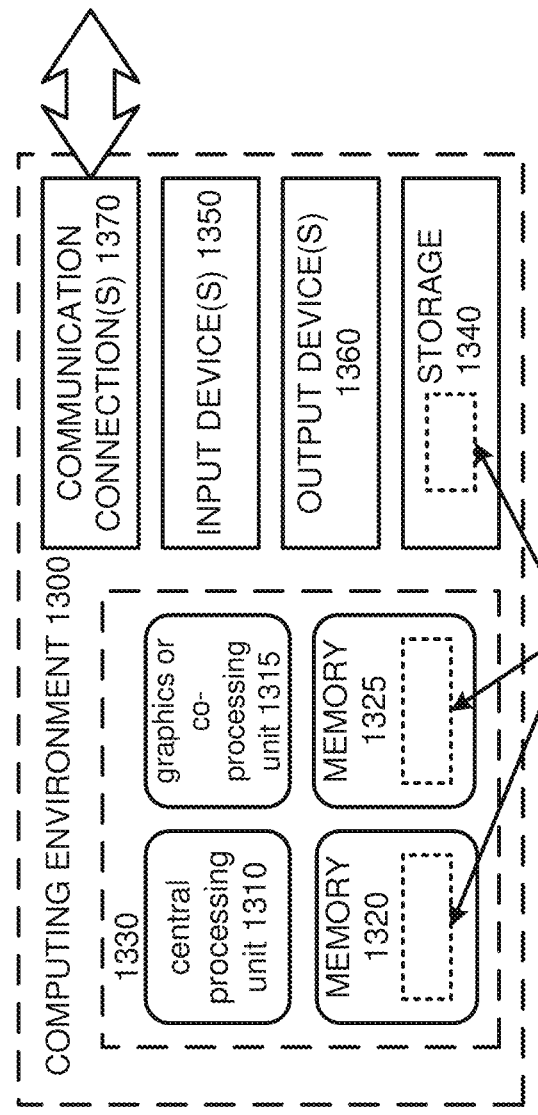
FIG. 13 depicts a generalized example of a suitable computing environment in which the described innovations may be implemented.

FIG. 13 depicts a generalized example of a suitable computing environment 1300 in which the described innovations may be implemented. The computing environment 1300 is not intended to suggest any limitation as to scope of use or functionality, as the innovations may be implemented in diverse general-purpose or special-purpose computing systems. For example, the computing environment 1300 can be any of a variety of computing devices (e.g., desktop computer, laptop computer, server computer, tablet computer, etc.).

With reference to FIG. 13, the computing environment 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing environment 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing environment 1300. The output device (s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method, comprising:
receiving network traffic data associated with a user;
estimating, based on the network traffic data, candidate network devices and links traversed by user data flows amongst a plurality of network devices and links, wherein a probabilistic determination is used in estimating the candidate network devices and links, and wherein the candidate network devices and links are used to form a subgraph, which includes the candidate network devices and the links that were traversed by the user data flows; and
mapping an adverse network event on the candidate network devices and links to determine an impact of the adverse network event on the user data flows.

2. The method of claim 1, wherein the network traffic data associated with the user comprises flow logs, the flow logs including data regarding the user data flows that occurred during a specified time period.

3. The method of claim 2, wherein the flow logs comprise respective source addresses and respective destination addresses of the user data flows.

4. The method of claim 3, wherein the flow logs further comprise one or more of: respective source ports of the user data flows, respective destination ports of the user data flows, respective transport protocols of the user data flows, virtual machine instance identifiers associated with the user data flows, respective numbers of packets or bytes transferred in the user data flows, or respective transport protocol status flags for the user data flows.

5. The method of claim 3, further comprising receiving network topology data, wherein estimating the candidate network devices traversed by the user data flows comprises mapping the respective source addresses and respective destination addresses of the user data flows to corresponding physical network devices based on the network topology data.

6. The method of claim 1, wherein the estimate of the links traversed by the user data flows is based on a frequency at which the packets associated with the user are traversing a specified portion of the network.

7. The method of claim 1, wherein the adverse network event is detected based on both an indication of how the network is adversely impacted and an indication of ongoing events or incidents that may be causing the adverse impact.

8. The method of claim 1, wherein determining the impact of the adverse network event on the user data flows comprises estimating a packet loss rate experienced by the user due to the adverse network event.

9. The method of claim 1, wherein determining the impact of the adverse network event on the user data flows comprises determining one or more network areas impacted by the adverse network event.

10. The method of claim 9, further comprising redirecting network traffic associated with the user away from the one or more network areas impacted by the adverse network event.

11. The method of claim 1, further comprising:
determining that the adverse network event impacts the user data flows; and
transmitting a notification to the user including details regarding the adverse network event.

* * * * *